UNITED STATES PATENT OFFICE.

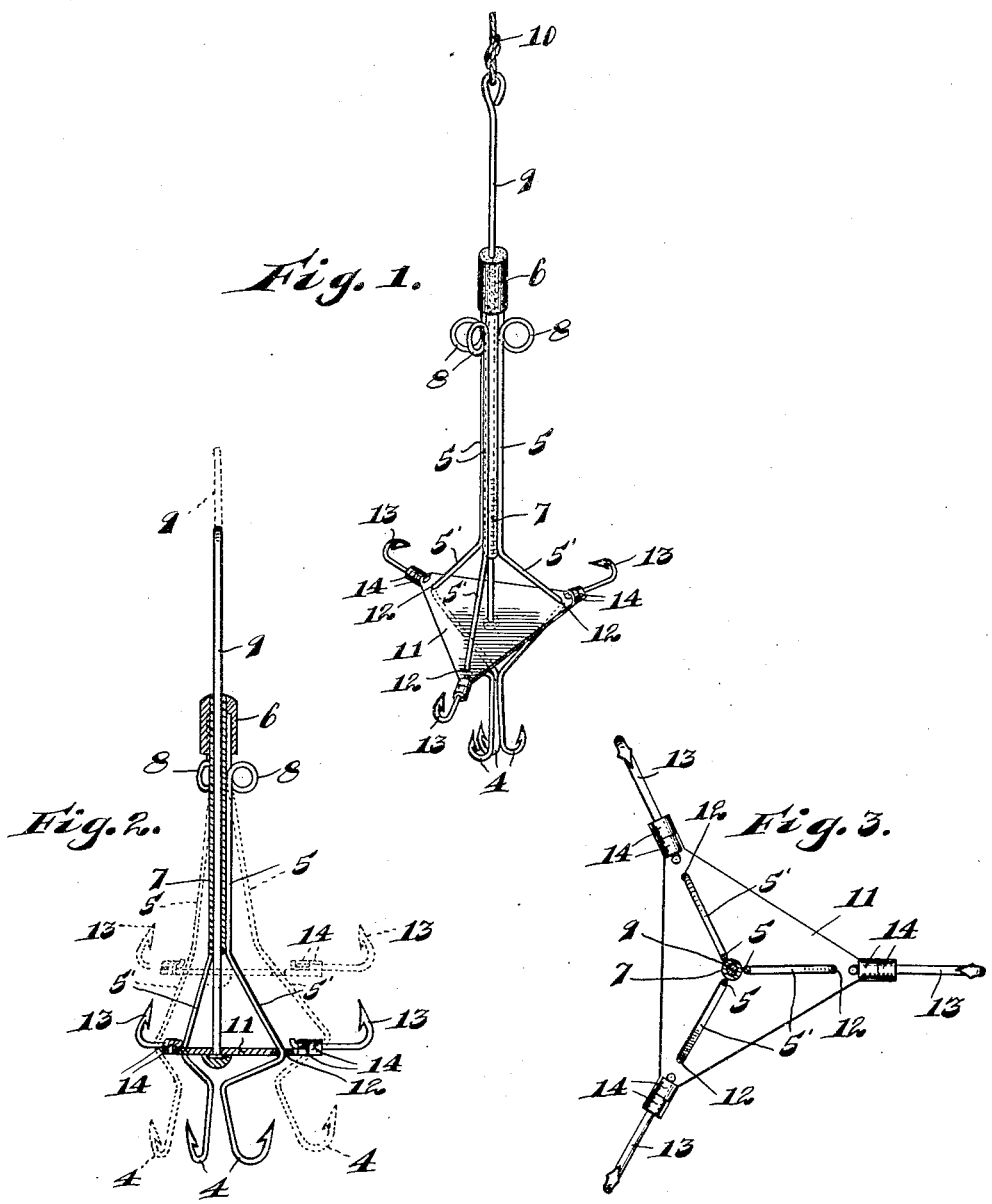

JOHN O. BECVAR, OF CHICAGO, ILLINOIS.

FISHHOOK.

1,336,987.  Specification of Letters Patent.  Patented Apr. 13, 1920.

Application filed January 13, 1919. Serial No. 270,842.

*To all whom it may concern:*

Be it known that I, JOHN O. BECVAR, a citizen of the United States, and a resident of the city of Chicago, county of Cook, and State of Illinois, have invented certain new and useful Improvements in Fishhooks, of which the following is a specification.

My invention relates to improvements in fish hooks, and has for its object the production of a device of this character which will be of economical construction and highly efficient in use.

Other objects will appear hereinafter.

The invention consists in the combinations and arrangements of parts hereinafter described and claimed.

The invention will be best understood by reference to the accompanying drawings forming a part of this specification, and in which:

Figure 1, is a perspective view of a fish hook embodying the invention,

Fig. 2, a longitudinal section thereof, and

Fig. 3, a transverse section of the same.

The preferred form of construction, as illustrated in the drawings, comprises a plurality of hooks 4 of the ordinary barbed formation, said hooks being provided with elongated resilient shanks 5, the upper or rearward ends of which are rigidly connected together at 6. Arranged between and fixed to the secured ends of said hook shanks is a longitudinally disposed tube 7. The arrangement is such that said hooks normally assume positions in close proximity with each other, as seen in Fig. 1, the same being adapted, however, to yield outwardly or spread as seen in dotted lines in Fig. 2. To permit of this yielding or spreading action, the shanks 5, adjacent their attached ends, are formed with coils 8.

Slidably mounted in the tube 7 is a stem 9 adapted, when the hook is in use, to be connected at one end with the fish line 10, as will be readily understood. The opposite end of stem 9 carries a triangular plate 11, in which are formed openings 12, which slidably engage with the hook shanks 5. Said shanks are formed with inclined portions 5' so that, during use of the fish hook, when a pulling force is exerted upon the hooks 4, causing sliding movement thereof relative to the plate 11, said plate, engaging with the inclined portions 5', will automatically effect spreading of the hooks 4, with the result that said hooks will become firmly embedded in the mouth of the fish engaging therewith and with the further result that the mouth of the fish will thus be held open. This holding open of the mouth of the fish is of special advantage in that it is well known that where a fish is dragged through the water with its mouth open, as from a moving boat, the fish soon drowns. Thus, with this arrangement, a fish engaging with a hook of the construction set forth will, as soon as it pulls upon the hook in an effort to free itself, become more firmly ensnared and thus capture practically insured.

To render the hook still more effective, the points of plate 11 may be provided with outwardly projecting hooks 13 rigidly secured to said plate by lips 14.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A device of the class described comprising a plurality of connected hooks movable toward and from each other; and means shiftable longitudinally with respect to said hooks for spreading the same when a pulling force is exerted on said hooks, the shanks of said hooks at opposite sides of said means converging toward each other, substantially as described.

2. A device of the class described comprising a plurality of connected hooks movable toward and from each other; and a plate shiftable longitudinally with respect to said hooks for spreading the same when a pulling force is exerted on said hooks, the shanks of said hooks at opposite sides of said plate converging toward each other, substantially as described.

3. A device of the class described comprising a plurality of connected hooks movable toward and from each other; means shiftable longitudinally with respect to said hooks for spreading the same when a pulling force is exerted on said hooks; and supplemental hooks carried by said means, substantially as described.

4. A device of the class described comprising a plurality of hooks having resilient shanks connected together so as to permit of spreading of said hooks; a tube arranged between and held by said shanks; a stem slidable in said tube; a member carried by said stem, engaging with said shanks for spreading said hooks when a pulling force is exerted thereon, said shanks having inclined portions engaged by said member; and supplemental hooks carried by said member, substantially as described.

In testimony whereof I have signed my name to this specification in the presence of two subscribing witnesses.

JOHN O. BECVAR.

Witnesses:
ARTHUR A. OLSON,
JOSHUA R. H. POTTS.